Patented Oct. 31, 1922.

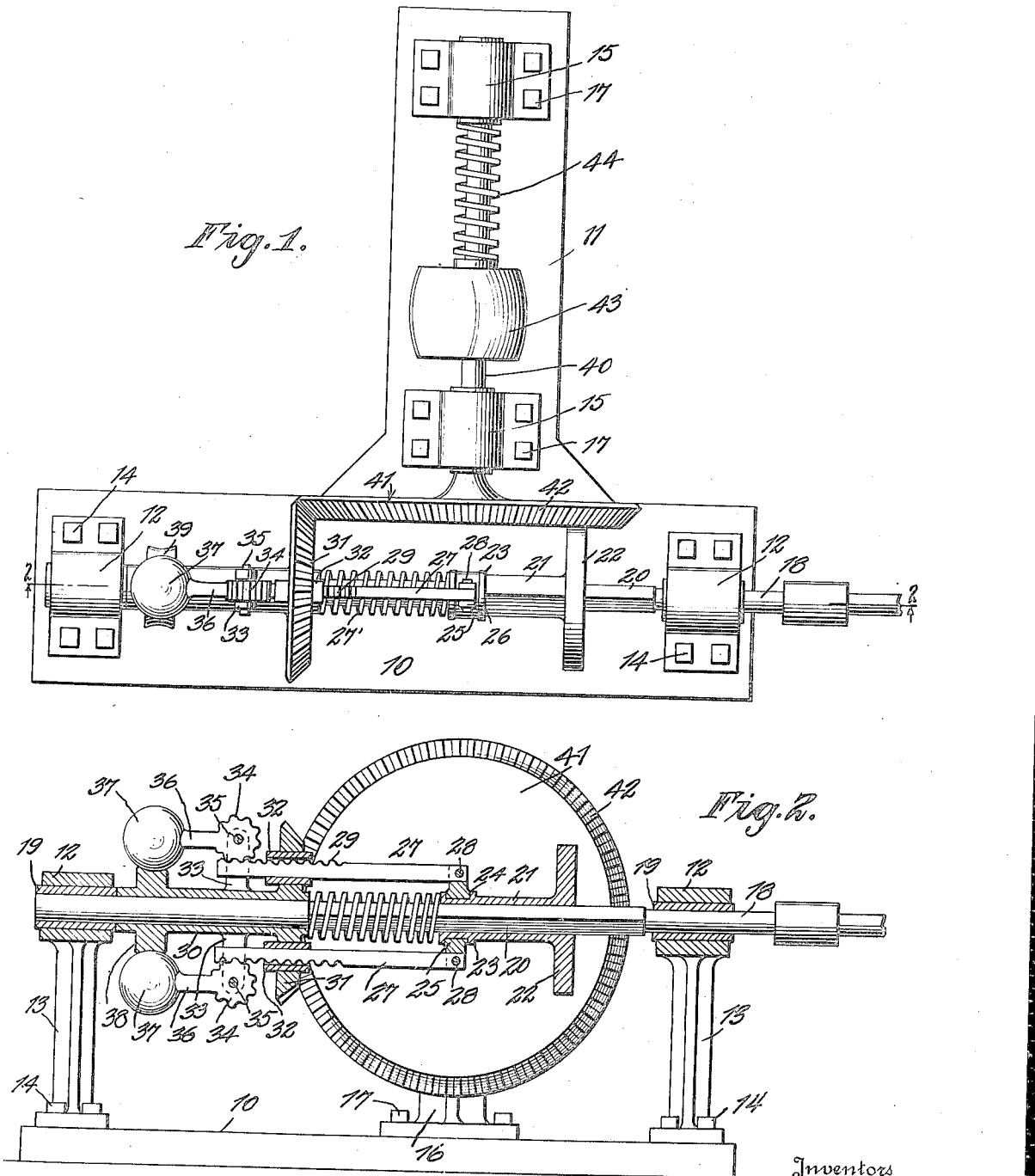

1,433,596

UNITED STATES PATENT OFFICE.

JOEL BINFIELD AND WILLARD S. BINFIELD, OF KENMARE, NORTH DAKOTA.

AUTOMATIC SPEED GOVERNOR.

Application filed July 12, 1921. Serial No. 484,034.

*To all whom it may concern:*

Be it known that we, JOEL BINFIELD and WILLARD S. BINFIELD, citizens of the United States, residing at Kenmare, in the county of Ward and State of North Dakota, have invented certain new and useful Improvements in Automatic Speed Governors, of which the following is a specification.

This invention relates to a new and improved automatic speed governor.

The main object of the invention is to provide an automatic speed governor which includes a master friction disc operating in a vertical plane, a second friction disc also rotating in a vertical plane at right angles to the master friction disc, adjustable longitudinally with respect thereto and having its peripheral edge in frictional engagement with the driving face of the master friction disc, governor mechanism suitably connected with and adapted to operate and adjust said second named friction disc with respect to said master friction disc, and means to positively drive said governor mechanism from said master friction disc.

Various other objects and advantages of our invention will become apparent during the continuance of the following description.

In the drawings:—

Figure 1 is a view in top plan showing our invention as in its preferred embodiment.

Figure 2 is a view partly in side elevation and partly in longitudinal cross section also showing our invention as in its preferred embodiment.

In describing our invention in detail, 10 designates the base or supporting structure which has a supplemental base or supporting structure 11 attached thereto as clearly shown in Figure 1. The main supporting structure 10 is provided adjacent the ends with aligned bearings 12 that are carried upon the upper ends of standards 13, the latter being fixed to the supporting structure by such means as shown at 14. Likewise, the supplemental supporting structure 11 is provided with aligned bearings 15 which are carried upon the upper ends of standards 16 and the standards 16 are secured in position by such means as shown at 17. Upon reference to Figure 1, it will be observed that the bearings 12 are aligned in a plane at right angles to the plane in which the bearings 15 are aligned. It will also be observed that the plane in which the bearings 15 are aligned intersects the plane in which the bearings 12 are aligned between the bearings 12.

A shaft 18 is carried by the bearings 12 suitable bushings 19 being provided to properly support the shaft with respect to the bearings. Intermediate its ends and between the bearings 12, the shaft 18 is provided with a squared portion 20 upon which is slidably mounted a sleeve 21 that is square when viewed in cross section. At one end the sleeve 21 carries a friction disc 22 that is adapted to rotate with the shaft 18 by reason of the squared portion 20 and the square sleeve 21 and which may be adjusted longitudinally with respect to the shaft because of the slidable mountings of the sleeve 21.

Adjacent its other end the sleeve 21 is slightly enlarged as shown at 23 said enlarged portion being provided with circular channels or grooves 24 that accommodate a loosely mounted collar 25. The collar 25 is provided at substantially diametrical points with extensions 26 that pivotally carry arms 27 as at 28; the arms being provided with teeth on their upper and lower edges respectively and adjacent their free end as shown at 29 and as will be observed upon reference to Figure 2.

Between one of the bearings 12 and the squared portion 20 of the shaft 18, the shaft carries a loosely mounted sleeve 30. At one end of the sleeve is carried a bevelled gear 31 which is adapted to mesh with another gear that will be hereinafter described, and at diametrically opposite points thereon a gear wheel 31 is provided with openings which accommodate sleeve-like bearings 32. The bearings 32 receive the arms 27 for slidable relation but inasmuch as the collar 25 is loosely mounted with respect to the sleeve 21, it will be observed that the bevelled gear 31 may be rotated at a speed different from the friction disc 22 without impairing the operation or efficiency of the device.

Intermediate its ends, the sleeve 30 is provided with oppositely extending extensions 33 which are designed to carry suitable governor mechanisms which in the present embodiment consist of gear wheels 34 mounted on shafts 35 which gear wheels are in turn provided with arms 36 that carry governor balls 37 at their outer ends as clearly shown in Figure 2. The sleeve is further provided with a fixed collar 38 having a concave periphery 39 against which the governor balls 37 rest when the device is inoperative or at very low speed.

From the above it will be observed that as the speed of the bevelled gear 31 increases the governor balls will move away from the sleeve 30 and the shaft 18, thereby turning the gear wheels 34 which engage and mesh with the tooth surface of the arms 27 and will move the arms longitudinally so as to adjust the friction disc 22 on the shaft 18.

Upon reference to Figure 1, it will be observed that the bearings 15 carry a shaft 40, the shaft being free to move longitudinally as will be hereinafter described. At its inner end the shaft is provided with a master friction disc 41 that is provided about its outer edge with bevelled gear teeth 42 adapted to mesh with the bevelled gear 31. In other words the master friction disc 41 is positively geared to the bevelled gear 31 so that the governor mechanism will be driven positively from the shaft 40. It will also be observed that the peripheral edge of the friction disc 22 engages the driving face of the master friction disc 41 and that as it is adjusted longitudinally across the face of the master friction disc, its speed will be varied.

Between the bearings 15, the shaft 40 is provided with a pulley 43 and between the pulley 43 and the outer one of the bearings is interposed a coil spring 44 that is designed to evenly retain the gear teeth 42 of the master friction disc 41 in engagement with the bevelled gear 31 and to maintain the master friction disc and the friction disc 22 in frictional engagement.

In the operation of the automatic speed governor, the shaft 40 being driven through the pulley 43 rotates the master friction disc 41 which in turn drives the shaft 18 through the medium of the friction disc 22. The master friction disc also positively drives the bevelled gear 31 and the governor mechanism. As the speed of the shaft 40 increases, the governor balls 37 will move outwardly from the shaft 18 thereby moving the friction disc 22 so as to maintain the shaft 18 at a constant speed. On the other hand, if the speed of the shaft 40 decreases, the friction disc 22 will be moved nearer the periphery of the master friction disc.

From the foregoing it is believed that the advantages and novel features of our invention will be readily understood and therefore further detailed description is deemed unnecessary.

What is claimed is:—

1. An automatic speed governor, a driving shaft, a friction disc carried thereby, bevelled gearings provided about the peripheral edge of said friction disc, a driven shaft a friction disc slidably mounted on said driven shaft and having its periphery in engagement with the driving face of said first named friction disc whereby said driven shaft may be rotated from said driving shaft, a bevelled gear loosely mounted on said driven shaft in co-meshing engagement with the bevelled gearing of said first named friction disc, governor means mounted to rotate with said bevelled gear, and means loosely connecting said governor means and said second named friction disc whereby said governor means will move said last friction disc toward and away from the center of said first named friction disc to maintain said driven shaft at a constant speed of rotation, substantially described.

2. An automatic speed governor comprising a master friction disc operating in a vertical plane, a gear and a friction disc also rotating in vertical planes at right angles to the master friction disc, said gear being fixed with respect to the master disc and adapted to be driven thereby, and said second disc being adjustable longitudinally with respect to the master disc and having its peripheral edge in frictional engagement with the driving face of the master friction disc, and governor means connected with said second main friction disc and operable through the said gear for adjusting the said second disc, said gear serving as a driver for the said governor mechanism.

3. An automatic speed governor comprising a main driving disc having a friction face and a tooth periphery, a driven disc at right angle to the friction face of the said main disc and adjustably transversely thereof, a gear disposed at right angle to the main disc and in engagement with the teeth periphery thereof, said gear having openings therethrough, slidable arms extending through the said openings a collar connecting the inner ends of the said arms in a loose manner to a sleeve on the said driven disc, said arms having gear teeth at their opposite ends, gear wheels engageable with the teeth of the said arms, and governor weights carried by said gears for actuating the latter to slide the arms for adjusting the driven disc with respect to the main disc.

In testimony whereof we affix our signatures.

JOEL BINFIELD.
WILLARD S. BINFIELD.